United States Patent Office 3,652,605
Patented Mar. 28, 1972

3,652,605
ISOMERISATION OF 17β-HYDROXY-STEROIDS
Jacobus Antonius van Gorp and Pieter Jurianus van Ree, Oss, Netherlands, assignors to Organon Inc., West Orange, N.J.
No Drawing. Filed Mar. 30, 1970, Ser. No. 24,020
Claims priority, application Netherlands, Apr. 8, 1969, 6905418
Int. Cl. C07c *169/08*
U.S. Cl. 260—397.4         4 Claims

ABSTRACT OF THE DISCLOSURE

The invention relates to an improved process for the preparation of 17α-hydroxy-steroids from the corresponding 17β-hydroxy-steroids by treating a 17-sulphonate of the latter with a mixture of an aliphatic carboxylic acid, an alkali metal salt of an aliphatic carboxylic acid and an aprotic solvent, followed by hydrolysis of the thus obtained 17α-acyloxy-compound.

---

The invention relates to a new method for the conversion of a 17β-hydroxy-steroid into the corresponding 17α-hydroxy compound via a 17-sulphonate of the former compound.

In general 17β-hydroxy-steroids have a stronger hormonal activity than the corresponding 17α-isomers, but the latter compounds are nevertheless frequently used in therapy because of their greater specificity.

From J. Am. Chem. Soc., 1955, pp. 4145–4149 it is known to convert the 17-tosylate of testosterone into 17-epi-testosterone by treatment of the former compound with acetic and potassium acetate. However, the yield is very poor and amounts to 3–5%.

Another well-known 17-isomerisation method applied to oestradiol and described in the Dutch Pat. No. 100,201 consists in that the 17-tosylate of oestradiol is reacted with a mixture of an alkali metal acetate and dimethylformamide by which, after saponification, the 17α-oestradiol or 17-epi-oestradiol is obtained in about 20% yield.

It has now been found that a considerably higher yield of 17α-hydroxy-steroids can be obtained from the corresponding 17β-hydroxy-steroids by reacting a sulphonate of a 17β-hydroxy-steroid with an alkali metal salt of a lower aliphatic carboxylic acid in the presence of a lower aliphatic carboxylic acid and an aprotic solvent, followed by hydrolysis of the 17α-acyloxy compound thus obtained to the free 17α-hydroxy compound.

The yield of this new method generally amounts to 65% or higher.

The 17β-hydroxy-steroids to be used as starting products are not tied to specific configurations and may belong to the gonane, androstane or oestrane series, of which in particular the following are mentioned: testosterone, 19-nor-testosterone, oestradiol, 17β-dihydro-equilin and 17β-dihydro-equilenin.

If the starting product also contains other esterifiable primary or secondary hydroxyl groups than the 17β-hydroxyl group to be sulphonylated, either the 17β-hydroxyl group must be partially sulphonylated, or these other hydroxyl groups must be temporarily protected.

The 17β-hydroxy-steroids are converted in a known manner into the corresponding 17β-sulphonyloxy compounds, for instance by reacting them with the relative sulphonyl chloride.

The sulphonyl group can, for instance, be an alkane sulphonyl group, such as methane sulphonyl or ethane sulphonyl, an aromatic sulphonyl group such as benzene sulphonyl, or an araliphatic sulphonyl group such as p-toluene sulphonyl.

The conversion according to the invention is usually performed by dissolving or suspending the relative 17β-sulphonyloxy-steroid in an aprotic solvent and by adding to this mixture an alkali metal salt of a lower aliphatic carboxylic acid and a lower aliphatic carboxylic acid. For the alkali metal salt and the free acid the same aliphatic carboxylic acid is preferably used, because otherwise a mixture of two different 17α-acyloxy compounds is obtained, but this is not essential for the present conversion, because the yield is not unfavourably influenced on application of two different acids, and the mixture naturally yields the same 17α-hydroxy compound after hydrolysis.

By an aprotic solvent, to be used in the process according to the invention, a solvent is understood that cannot release protons, or can only do so in a small degree. As examples of such solvents the following are mentioned: hydrocarbons such as benzene or toluene, N,N-dialkylacylamides such as dimethylformamide or dimethylacetamide, ethers such as tetrahydrofuran, halogenated hydrocarbons such as chlorobenzene, amines such as piperidine, and a number of other solvents such as dimethylsulphoxide, N-methylpyrrolidone, and others. The aprotic solvent should preferably not be low-boiling, which means that it should preferably have a boiling-point higher than 120° C.

Very good yields were obtained with a N,N-dialkylacylamide such as dimethylformamide.

By a lower aliphatic carboxylic acid is meant a branched or unbranched aliphatic carboxylic acid with 1–6 carbon atoms such as formic acid, acetic acid, propionic acid, butyric acid, trimethyl acetic acid or pentane carboxylic acid. As mentioned before the free carboxylic acid to be used in the present conversion may be another than the carboxylic acid, which is used in the form of the alkali metal salt, but usually both acids are identical.

Preferably a mixture of sodium or potassium acetate and glacial acetic acid is used.

The proportions of the quantities of steroid, alkali metal acylate and free carboxylic acid vary between wide limits. The proportion between alkali metal acylate and free carboxylic acid usually varies between the molar limits of 1:0.5 and 1:2.

The best yields were obtained with a molar proportion of 1:1.

The hydrolysis of the 17α-acyloxy-steroids obtained according to the process of the invention is performed in the conventional manner, for instance by treatment with a solution of an alkali metal hydroxide in an alcohol.

In the examples following hereafter the invention is further illustrated.

EXAMPLE I

One gm. $\Delta^{1,3,5(10),7}$ - oestratetraene-3,17β-diol-3-benzoate-17β-tosylate was suspended in 15 ml. dimethylformamide. After adding 5 gm. potassium acetate, O aq. and 1.3 ml. acetic acid, the mixture was refluxed in nitrogen atmosphere for 6 hours. After cooling the mixture was diluted with water, during which process the isomerisation product precipitated. The precipitate was taken up in 20 ml. ethanol, after which $N_2$ was bubbled through the solution. Then 6 ml. 20% KOH was added, after which the mixture was refluxed for 2 hours in nitrogen atmosphere. After cooling and neutralising with acetic acid the bubbling through of $N_2$ was stopped, the reaction mixture diluted with water and then extracted with chloroform. The chloroform extract was washed with water and evaporated to dryness in vacuo. The residue was chromatographed over silicagel. Elution with benzene yielded an apolar by-product, which could be eluted with benzene-ethylacetate-17α-dihydro-equilin. Yield: 73% of the theory. F=202–204° C.; $[\alpha]_D^{20}$= +203° (ethanol).

EXAMPLE II

One gm. $\Delta^{1,3,5(10)}$ - oestratriene-3,17β-diol-3-benzoate-17β-mesylate was suspended in 15 ml. dimethylformamide with 4.2 g. potassiumformiate. Then 1.87 ml. formic acid was added, after which the mixture was refluxed in nitrogen atmosphere for 7 hours. After cooling down to room temperature the reaction mixture was diluted with water, after which the precipitate formed was sucked off and washed. The isomerisation product was then taken up in 20 ml. ethanol and boiled with 6 ml. 20% KOH in nitrogen atmosphere for 2 hours. After cooling and neutralizing with acetic acid the mixture extracted with chloroform, after which the extract was evaporated to dryness in vacuo.

The residue was chromatographed over silicagel, after which an apolar by-product was eluted, and pure 17α-oestradiol could be isolated. Yield: 69% of the theory. F=218–220° C.; $[\alpha]_D^{20}$= +53° (dioxane).

EXAMPLE III

One gm. testosterone - 17β - tosylate was suspended in 20 ml. N-methyl-pyrrolidone. After the addition of 5 gm. potassium propionate and 3.3 ml. propionic acid the reaction mixture was heated for 4 hours at 160° C. in nitrogen atmosphere, while stirring. The mixture was poured into water and then extracted with chloroform. The chloroform extract was washed with water and evaporated to dryness in vacuo. The residue was saponified by boiling it, in nitrogen atmophere, in 20 ml. ethanol with 6 ml. 20% NaOH. Then the mixture was cooled and diluted with water, and the ethanol evaporated in vacuo, after which the mixture was extracted with chloroform. The chloroform extract was evaporated to dryness in vacuo and the residue was chromatographed over silicagel, to obtain the 17-epi-testosterone. F=220–221° C.; $[\alpha]_D^{20}$= +71.5° (ethanol).

We claim:

1. Process for the conversion of a 17β-hydroxy-steroid selected from the group consisting of the gonane, androstane, and oestrane series, to the corresponding 17α-hydroxy-steroid, comprising the steps of reacting a 17β-sulfonyloxy-steroid of said series with an alkali metal salt of a lower aliphatic carboxylic acid in the presence of a lower aliphatic carboxylic acid, the molar proportion between said alkali metal salt and said free carboxylic acid being between about 1:0.5 and about 1:2, and an aprotic solvent, and thereafter hydrolyzing the 17α-acyloxy-steroid thus obtained to the free 17α-hydroxy-steroid.

2. The process of claim 1 in which the aprotic solvent is an N,N-dialkylacylamide.

3. The process of claim 1 in which the aprotic solvent is N,N-dimethylformamide.

4. The process of claim 1 in which said alkali metal salt is an alkali metal acetate and said lower aliphatic carboxylic acid is acetic acid.

No references cited.

HENRY A. FRENCH, Primary Examiner

U.S. Cl. X.R.

260—397.5